July 7, 1942.  J. C. YUHAS  2,288,986
DICING MACHINE
Filed Dec. 9, 1940  3 Sheets-Sheet 2

Joseph C. Yuhas
INVENTOR

BY Carl Miller
ATTORNEY

July 7, 1942.  J. C. YUHAS  2,288,986
DICING MACHINE
Filed Dec. 9, 1940  3 Sheets-Sheet 3
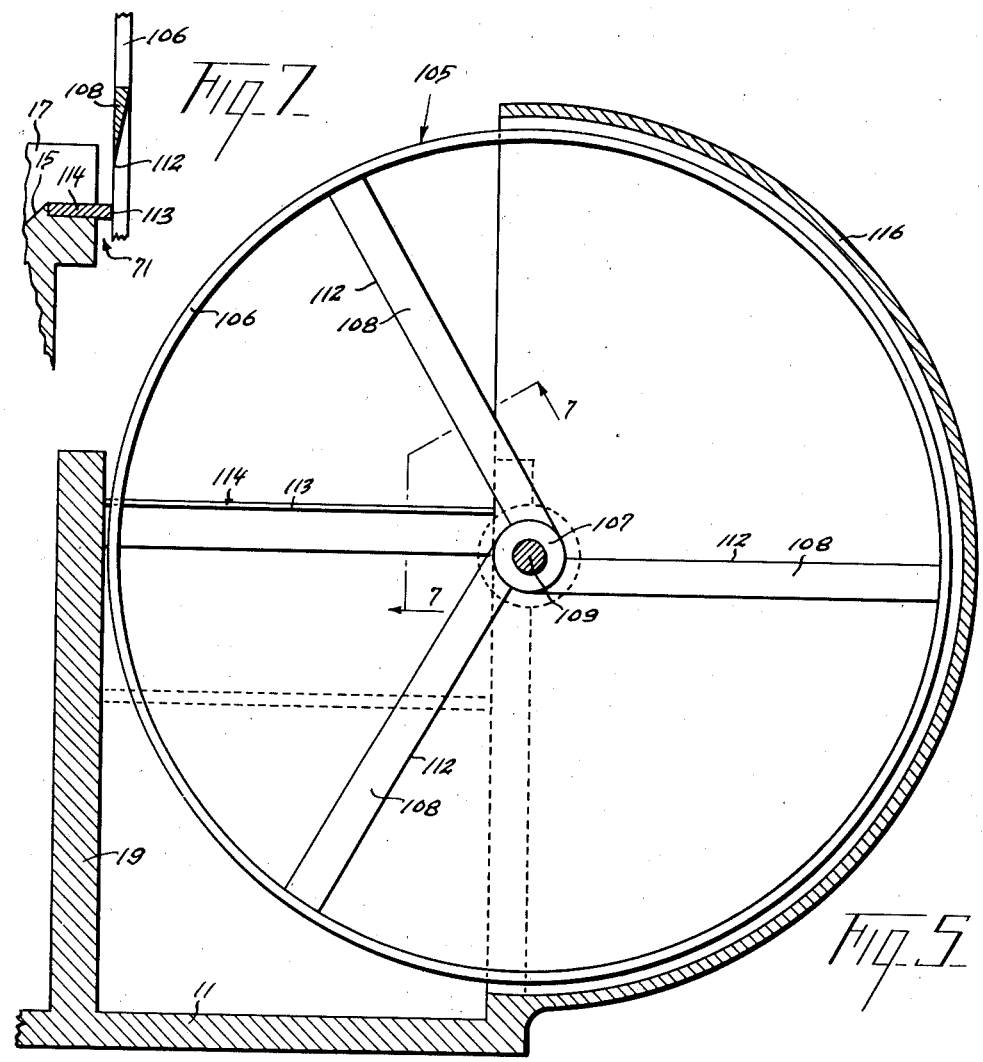
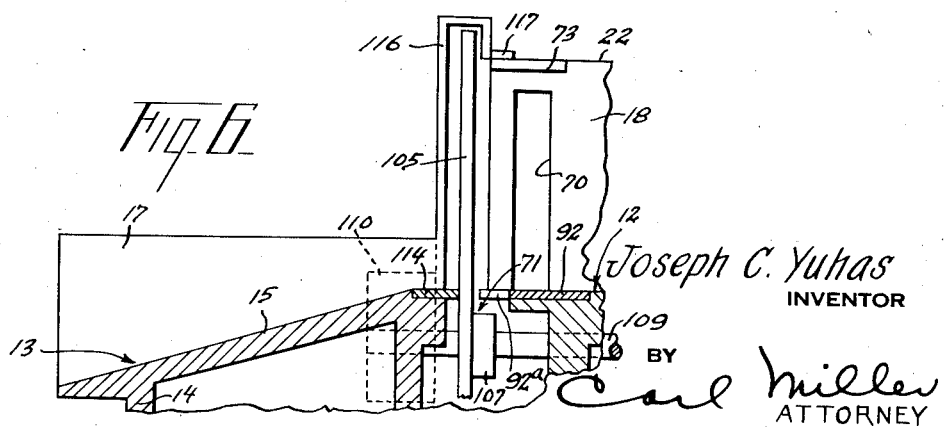
Joseph C. Yuhas
INVENTOR
BY Carl Miller
ATTORNEY Patented July 7, 1942

2,288,986

UNITED STATES PATENT OFFICE 2,288,986

DICING MACHINE

Joseph C. Yuhas, Duryea, Pa.

Application December 9, 1940, Serial No. 369,295

6 Claims. (Cl. 146—78)

The present invention relates to a dicing machine and more particularly to a device for producing diced particles of onion.

It is an object of this invention to provide a new and improved dicing machine which is simple in operation and which will dice onions without loosing any of the onion's flavor, although the machine will dice fruits and vegetables of varied shape and form without wastage.

An additional object of this invention is to provide a dicing machine suitable for cutting fruits and vegetables into cube-shaped particles by a series of cutting operations which cooperate in such a manner that the substance being diced is held properly positioned by certain of the cutters moving in parallel planes but in directions right angles to each other to divide the substance into elongated rectangular strips or blocks which are simultaneously severed into cube-shaped particles by a slicing blade.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Figure 3 is a detail view showing attachment of cutting saws to grate bars.

Figure 4 is a detail sectional view taken on line 4—4, Figure 3.

Figure 5 is a transverse sectional view of the machine taken on line 5—5, Figure 1, showing rotary cutter.

Figure 6 is a detail sectional view taken on line 6—6, Figure 1.

Figure 7 is a detail sectional view taken on line 7—7, Figure 5.

Figure 1:
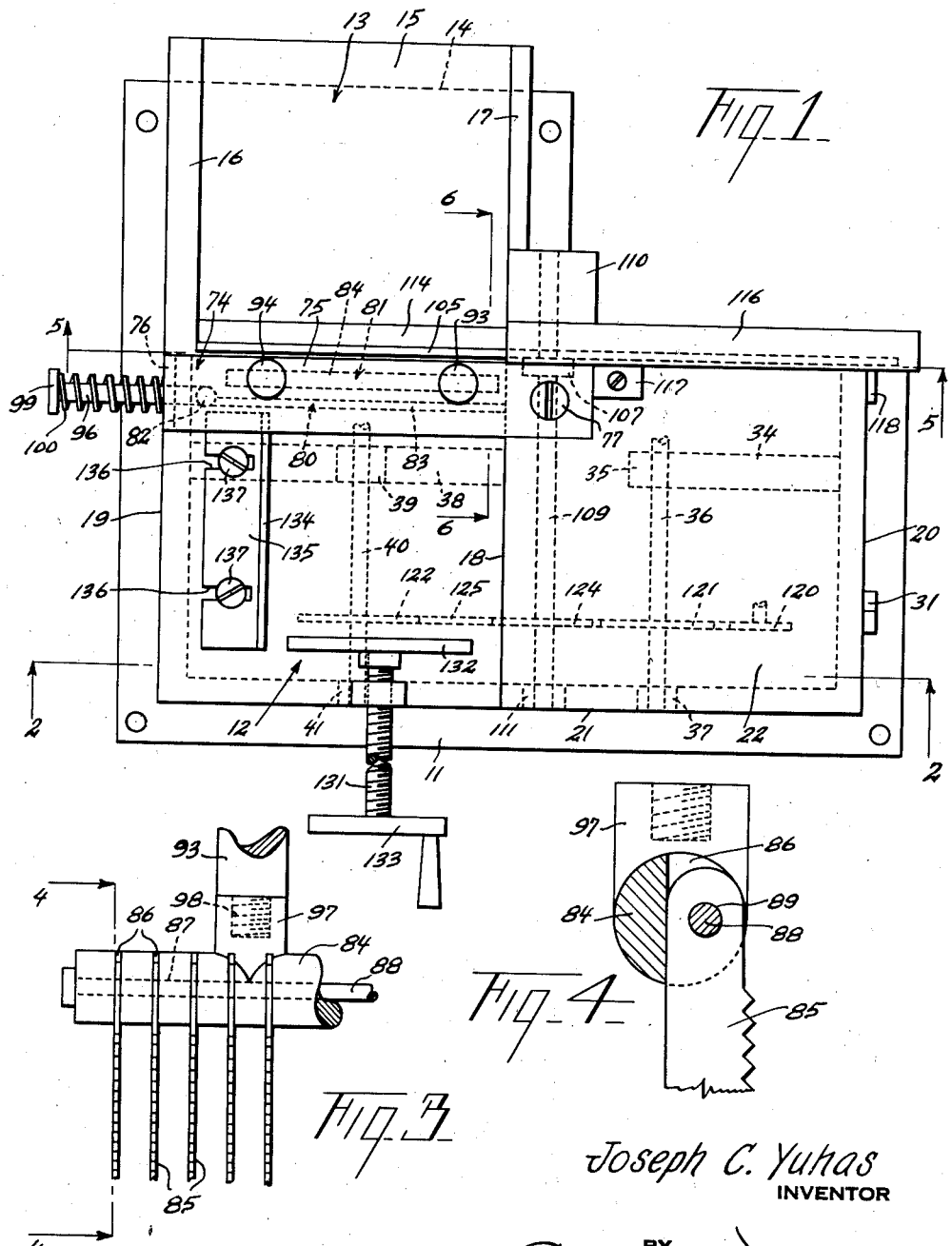
Figure 1 is a plan view of the dicing machine.

Referring to the drawings in detail, the dicing machine comprises a housing 10 formed in any desired manner to provide an attaching base 11, a horizontal table 12 located at a substantial vertical distance above the base 11 and a hopper 13 arranged in front of the table 12. The hopper 13 preferably overhangs the front wall 14 of the housing 10 and is defined by the inclined wall 15 and the side walls 16 and 17. Viewing Figure 1 it will be observed that the table 12 and hopper 13 are disposed on the left side of the machine, that portion of the housing immediately to the right of the table 12 extending above the same and including a vertical wall 18. The housing 10 is further defined by the side walls 19 and 20, end wall 21, and top wall 22.

Arranged within the housing 10 is a platform 25 which serves as a support for a motor 26. The motor 26 which may be of any desired power and type commensurate with the purpose intended is mounted on a base 27 provided at one end with an elongated slot 28 receiving therethrough the shank of a bolt 29 anchored in the platform 25, the bolt serving also to anchor the base to the platform. At its other end the base 27 is formed with an upstanding lug 30 which threadedly receives an adjusting bolt 31 rotatably supported in the housing wall 20. Thus, rotation of the bolt 31 will impart movement to the base 27 towards or away from the wall 20 depending upon which direction the bolt 31 is rotated, this movement being such as to adjust the position of the motor 26 for a purpose to be hereinafter described.

Figure 2:
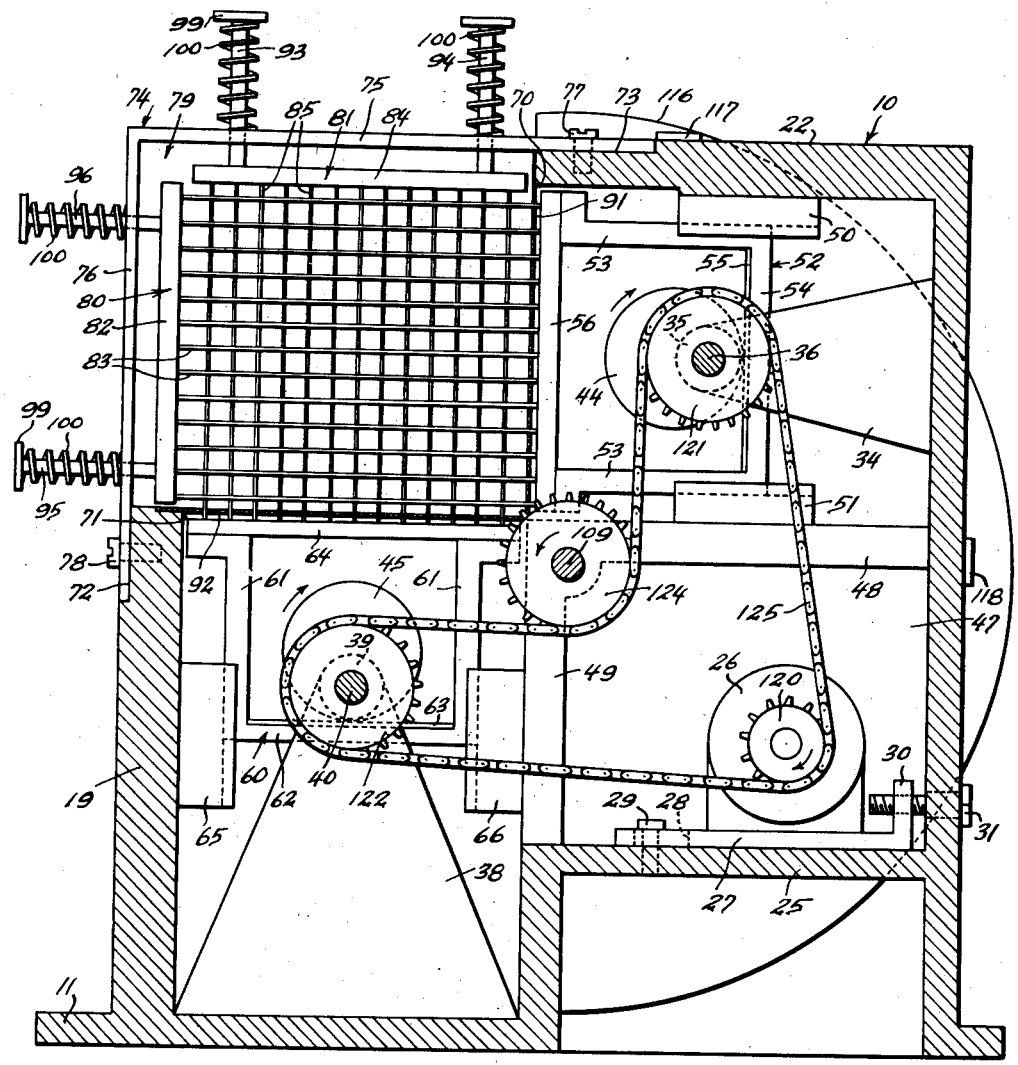
Figure 2 is a transverse sectional view of the machine taken on line 2—2, Figure 1, showing horizontal and vertical reciprocating cutter grates.

Extending laterally from the wall 20, see Figure 2, is a bracket 34 which is rigid with said wall, said bracket being provided at its free end with a bearing housing 35 rotatably supporting an end of a shaft 36, the other end of said shaft being rotatably supported in a bearing housing 37 mounted in the housing end wall 21, see Figure 1. Similarly extending upwardly from the base of the housing 10 is a bracket 38, rigid with said base, and provided at its free end with a bearing housing 39 rotatably supporting one end of a shaft 40, the other end of the shaft being rotatably supported in a bearing housing 41 mounted in the housing end wall 21. Each of the shafts 36 and 40 extend forwardly beyond its respective supporting bracket. The shaft 36 has fixedly mounted on its extended end a cam 44 which is in the form of a circular disc eccentrically mounted on the shaft 36. The shaft 40 has similarly mounted on its extended end a cam 45 which is identical with the cam 44.

The housing 10 is further provided with a wall portion 47 which is directly opposite the end wall 21, which wall portion has provided thereon inwardly directed ledge supports 48 and 49, disposed in right angular relation. Fixedly mounted on the underside of the top wall 22 is a guide block 50, and similarly mounted on the ledge support 48 is a guide block 51, both guide blocks being disposed in the plane of the cam 44 and in opposed relation to each other. The guide blocks 50 and 51 slidably support for horizontal reciprocatory movement thereon a cam follower 52, having legs 53 which seat in suitable guide grooves formed in said guide blocks. The legs 53 are rigidly connected by a thrust bar 54 provided on its inner face with a wear plate 55 adapted to be engaged by the periphery of the cam 44. As shown in Figure 2, the legs 53 of the cam follower 52 straddle the cam 44 and lie in the same plane therewith, the axis of rotation of the cam lying midway between said legs. Bridging the legs 53 at their free ends is a grate bar 56 which is detachably secured to said ends in any desired manner (not shown), the function of said grate bar to be hereinafter described.

In a like manner, there is provided for coaction with the cam 45, a cam follower 60 comprising legs 61, thrust bar 62, wear plate 63 and grate bar 64, the whole being identical with the cam follower 52 as above described. The legs 61 of the cam follower 60 are guided for vertical reciprocatory movement by the guide blocks 65 and 66, the former being rigidly mounted in the housing wall 19, while the latter is rigidly mounted in opposed relation on the ledge support 49. As with the cam 44 and its coacting cam follower 52, the axis of rotation of the cam 45 is located midway between the legs 61 of the cam follower 60.

The housing wall 18 is provided with a vertical rectangular opening 70, see Figure 6 which lies in opposed relation to the grate bar 56 of the cam follower 52. A like rectangular opening 71 is provided in the table 12 opposite the grate bar 64 of the cam follower 60. Formed in the outer surface of the housing walls 19 and 22, are recesses 72 and 73 which respectively seat the ends of a right angle bracket 74 comprising the horizontal arm 75 and vertical arm 76. The bracket 74 is formed of substantially heavy flat metal stock and is rigidly connected at its ends to the housing walls by the screws 77 and 78, said bracket with the table 12 and housing wall 18 defining a substantially square frame opening 79, as clearly shown in Figure 2.

Mounted for reciprocatory movement at right angles to each other within the above mentioned frame opening 79 are the cutter grates 80 and 81. The cutter grate 80 consists of the grate bar 56 and an opposed grate bar 82, and connecting the grate bars is a horizontal row of equally spaced saw blades 83. The cutter grate 81 consists of the grate bar 64 and an opposed grate bar 84, and connecting the grate bars is a like row of vertical equally spaced saw blades 85. Each of the grate bars, see Figures 3 and 4, is provided with a row of axially equally spaced slots 86 into which is adapted to seat an end of a saw blade. The grate bars are each provided with a longitudinal bore 87 which is adapted to snugly receive a rod 88. The ends of each saw blade are perforated as at 89 such that when properly seated in their respective grate bar slots 86 in registry with the bore 87 thereof, the rod 88 may be inserted completely into said bore whereby the saw blades are securely locked to the grate bars. Any desired means may be utilized for locking the rod 88 to its associated grate bar. It is to be understood that the saw blades must be of the same size and that preferably both cutter grates 80 and 81 are identical. Furthermore the saw blades in both cutter grates face in the same direction. The spacing between the saw blades is such that the same will define horizontal and vertical rows of small square openings when viewed in elevation, see Figure 2. It will be noted that the inner ends of the saw blades 83 and 85 respectively extend through the rectangular openings 70 and 71, said openings being respectively normally closed, wholly by the slotted cover plate 91 and in part by the cover plate 92. The slots therein being of such a size as to permit freedom of reciprocatory movement of the saw blades extending therethrough. The slotted cover plates 91 and 92 each lie flush with the respective outer surface of the wall 18 and table 12 and are detachably secured thereto in any desired manner (not shown). In the cover plate 92 the slots 92a extend to the front edge thereof, see Figure 6, said cover plate extending over substantially half the width of the opening 71, for a purpose to be hereinafter described.

The outer grate bars 82 and 84 are each respectively provided with a pair of spaced guide rods 93, 94 and 95, 96. Each of the outer grate bars 82 and 84 is provided with an internally threaded stud 97, see Figure 3, which is formed integral with the grate bar as by welding, adjacent each end thereof. The guide rods are each provided with a threaded extension 98 adapted to threadedly engage the internally threaded stud whereby to provide a rigid connection therebetween. As shown in Figure 2 the guide rods are disposed in parallel relation and normal to their respective grate bar, each guide rod being provided at its free end with a flanged head 99 adapted to serve as a seat for one end of a compression coil spring 100 surrounding the guide rod. The guide rods 93, 94 slidably extend through suitable guide openings in the arm 75 of the bracket 74, and in a like manner the guide rods 95, 96 slidably extend through guide openings in the arm 76. The other end of each of the coil springs 100 is adapted to seat on the arms 75, 76 of the bracket 74, as clearly shown.

When in the assembled position of the cutter grates 80 and 81, the coil springs 100 are placed under an initial compression such as to place the saw blades of each cutter grate under tension and at the same time cause the cam follower connected thereto, to engage at all times the periphery of its associated cam. It is also to be noted that the cutter grate 81 carrying the vertical saw blades is disposed forwardly of the cutter grate 80 carrying the horizontal saw blades, both cutter grates being arranged closely adjacent to each other.

Arranged forwardly of the vertical cutter grate 81 and also closely adjacent thereto is a rotary blade cutter 105. The rotary blade cutter 105 as shown in elevation, see Figure 5, comprises a ring 106, a hub 107 and three blades 108. The hub 107 is fixedly mounted on a shaft 109, supported by bearing housings 110 and 111, see Figure 1. The ring 106 is of a thickness not greater than the maximum thickness of each of the blades, which as shown in Figure 7 taper down to a sharp knife edge 112. The blades 108 are adapted to move across the edge 113 of a plate element 114 in a scissor like arrangement. The plate 114 extending over the opening 71 in opposed relation to the cover plate 92 as shown in Figure 6, the rotary blade cutter 105 moving between said plate element 114 and cover plate 92. Viewing Figure 5 it will be observed that the axis of rotation of the rotary blade cutter 105 is below and well to the right of the plate element 114 the length of which is substantially that of the width of the table 12. The length of the blades 103 is such as to sweep substantially across the entire length of the plate element 114 and substantially across the entire face of the cutter grate 81. A guard casing 116 provided with attaching lugs 117, 118 is detachably secured to the housing 10 for covering the rotary blade cutter 105.

A sprocket wheel chain drive is utilized for simultaneously operating the cutter grates 80, 81 and rotary blade cutter 105. Thus, the motor 26 is provided with a sprocket wheel 120, and the cam shafts 36 and 40 are provided with like sprocket wheels 121 and 122. A sprocket wheel 124 is mounted on the rotary blade cutter shaft 109. All the sprocket wheels are in the same vertical plane and are interconnected by a chain belt 125, such that the cam shafts 36 and 40 will be rotated in a clockwise direction while the rotary blade cutter shaft 109 will be rotated in a counterclockwise direction, as viewed in Figure 2. Proper tension of the chain belt 125 is achieved by adjustment of the motor base 27 in the manner as hereinabove described. Any desired speed ratio as between the cam shafts and rotary blade cutter shaft may be obtained by suitable variation in the size of the sprocket wheels utilized.

In the position of the cams 44 and 45 with relation to their respective cam followers 52 and 60, as shown in Figure 2, it is obvious that upon rotation of the same there will be imparted an inward movement (to the right) of the cutter grate 80 and a downward movement of the cutter grate 81, return movements of the cutter grates in the opposite direction being obtained by the expansion of the compressed coil springs 100. This operation of the cutter grates will cause reciprocatory movements thereof at a speed depending upon the speed of the motor and the size of the sprocket wheels 120 and 121, 122, the latter two being at all times of the same size, so that both cutter grates will always move at the same speed.

Extending above the table 12 in the plane of the end wall 21 is a boss supporting a screw 131 threadedly mounted therein for longitudinal movement over the table 12. The screw 131 carries at its inner end an abutment plate 132 and at its outer end a crank 133. Arranged on the table 12 for movement towards or away from the housing wall 18 is a guide plate 134 having a base 135 which is slotted as at 136 for the reception of adjusting screws 137. The guide plate is adjusted with relation to the housing wall 18 to accommodate therebetween the fruit or vegetable to be diced, said fruit or vegetable being fed through the cutter grates and rotary blade cutter by the turning of the feed screw 131.

In the operation of the machine, an onion for example is placed on the table 12 and fed forwardly by means of the feed screw 131. With the motion "on," the cutter grates are vibrating in their respective directions and the rotary blade cutter is turning. As the onion is fed into the first cutter grate 80, the same is horizontally sliced by the horizontal saw blades 83. Continued forward feeding of the onion will bring the same into the second cutter grate 81, where the same is vertically sliced by the vertical saw blades 85, the onion being thus cut into elongated like blocks or strips each square in cross-section. Further forward feeding of the onion will then bring the cut elongated strips into the path of the blades 108 of the rotary cutter 105 whereby the strips are cut thereby into small cubes falling into the hopper 13 and by gravity into a suitable receptacle.

Having thus described the invention, what is claimed is:

1. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, one of said cutter grates moving vertically in said opening, and a rotary blade cutter mounted to operate in said opening for rotary movement in a vertical plane parallel to the planes of movement of said cutter grates and disposed between said hopper and the cutter grate nearest thereto, and a plate element mounted on said hopper co-extensive with and projecting partially across said opening, said plate element having an edge arranged to be engaged by said rotary blade cutter to effect therewith a scissor-like cutting action.

2. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, one of said cutter grates moving vertically in said opening, and a rotary blade cutter mounted to operate in said opening for rotary movement in a vertical plane parallel to the planes of movement of said cutter grates and disposed between said hopper and the cutter grate nearest thereto, a plate element mounted on said hopper co-extensive with and projecting partially across said opening, said plate element having an edge arranged to be slidably engaged by said rotary blade cutter to effect therewith a scissor-like cutting action, means on said table for moving said substance into the paths of movement of said cutter grates and rotary blade cutter whereby to be cut into small cube-like particles, and power operated means for simultaneously driving said cutter grates and said rotary blade cutter.

3. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, one of said cutter grates moving vertically in said opening, and a rotary blade cutter mounted to operate in said opening for rotary movement in a vertical plane parallel to the planes of movement of said cutter grates and disposed between said hopper and the cutter grate nearest thereto, a plate element mounted on said hopper co-extensive with and projecting partially across said opening, said plate element having an edge arranged to be slidably engaged by said rotary blade cutter to effect therewith a scissor-like cutting action, guide means on said table comprising a vertical stationary wall and an adjustable guide wall, and a screw operated abutment plate movable between said walls for moving said substance into the paths of movement of said cutter grates and rotary blade cutter whereby to be cut into small cube-like particles, a cam mechanism within said housing for each cutter grate for moving the same in one direction, spring return means for each cutter grate arranged externally of said housing moving the same in the opposite direction, and power operated means wholly within said housing for simultaneously driving said cam mechanisms and said rotary blade cutter.

4. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, each said cutter grate comprising a like plurality of parallel equally spaced saw blades having their cutting edges facing said supporting table, one of said cutter grates moving vertically in said opening, and a rotary blade cutter including a plurality of radial knife blades mounted to operate in said opening for rotary movement in a vertical plane parallel to the planes of movement of said cutter grates and disposed between said hopper and the cutter grate nearest thereto, the axis of rotation of said rotary cutter blade being so located and the radial length of each knife blade being such that said knife blades will sweep substantially across the entire face of the cutter grate immediately adjacent thereto, and a plate element mounted on said hopper co-extensive with and projecting partially across said opening, said plate element having an edge arranged to be slidably engaged by each of the knife blades of said rotary blade cutter to effect therewith a scissor-like cutting action.

5. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, one of said cutter grates moving vertically in said opening, and a rotary blade cutter mounted to operate in said opening for rotary movement in a vertical plane parallel to the planes of movement of said cutter grates and disposed between said hopper and the cutter grate nearest thereto, a cam mechanism within said housing for each cutter grate for moving the same in one direction comprising a cam follower connected to one end of each cutter grate, fixed guide means within said housing slidably engaged by each cam follower, a cam engaging each follower imparting movement thereto in one direction, spring return means connected to the other end of each cutter grate, and power operated means within said housing for simultaneously driving said cams and said rotary blade cutter.

6. A dicing machine comprising a housing having a horizontal supporting table for a substance to be diced, said housing including a hopper arranged at one end of said supporting table and defining therewith at said end an elongated transverse opening, a pair of reciprocating cutter grates disposed in side by side relationship for movement in vertical parallel planes in directions at right angles to each other, one of said cutter grates moving vertically in said opening, and a rotary blade cutter mounted to operate in said opening for rotary movement in a vertical plane parallel to the planes of movement of said cutter grates and disposed between said hopper and the cutter grate nearest thereto, a cam mechanism within said housing for each cutter grate for moving the same in one direction comprising a cam follower connected to one end of each cutter grate, fixed guide means within said housing slidably engaged by each cam follower, a cam engaging each follower imparting movement thereto in one direction, spring return means connected to the other end of each cutter grate, and power operated means within said housing for simultaneously driving said cams and said rotary blade cutter, bracket means mounted externally of said housing including slidable rods for supporting said other end of each of said cutter grates, said spring return means comprising a compression coil spring surrounding each slidable rod and seated on said bracket means, each said cutter grate comprising a rigid bar member at each end thereof, and a plurality of equally spaced saw blades connected at their ends to said bar members.

JOSEPH C. YUHAS.